(12) United States Patent
Eppler

(10) Patent No.: US 7,440,384 B2
(45) Date of Patent: *Oct. 21, 2008

(54) MAGNETIC RECORDING DEVICE FOR HEAT ASSISTED MAGNETIC RECORDING

(75) Inventor: Walter Richard Eppler, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/709,065

(22) Filed: Feb. 21, 2007

(65) Prior Publication Data

US 2007/0153642 A1 Jul. 5, 2007

Related U.S. Application Data

(63) Continuation of application No. 10/374,451, filed on Feb. 26, 2003, now Pat. No. 7,215,629.

(60) Provisional application No. 60/390,172, filed on Jun. 20, 2002.

(51) Int. Cl.
*G11B 7/00* (2006.01)

(52) U.S. Cl. ............... 369/112.27; 360/59; 369/13.33

(58) Field of Classification Search ............ 360/59; 369/13.13, 13.33
See application file for complete search history.

(56) References Cited

U.S. PATENT DOCUMENTS

| 5,986,978 | A | 11/1999 | Rottmayer et al. |
| 5,991,126 | A | 11/1999 | Hayashi et al. |
| 6,016,290 | A | 1/2000 | Chen et al. |
| 6,349,076 | B1 | 2/2002 | Chen |
| 6,396,776 | B1 | 5/2002 | Ueyanagi |
| 6,404,706 | B1 | 6/2002 | Stovall et al. |
| 6,407,892 | B2 | 6/2002 | Shiroishi |
| 6,507,540 | B1 | 1/2003 | Berg et al. |
| 6,618,330 | B1 | 9/2003 | Kawasaki et al. |
| 6,633,513 | B1 | 10/2003 | Kim et al. |
| 6,700,838 | B1 | 3/2004 | McDaniel |
| 6,704,250 | B1 | 3/2004 | Ueyanagi |
| 6,795,380 | B2 | 9/2004 | Akiyama et al. |
| 6,807,131 | B1 | 10/2004 | Hesselink et al. |
| 6,873,576 | B1 * | 3/2005 | Van Kesteren ........... 369/13.17 |
| 6,982,844 | B2 | 1/2006 | Rettner et al. |
| 7,042,810 | B2 * | 5/2006 | Akiyama et al. ......... 369/13.33 |
| 2001/0017820 | A1 | 8/2001 | Akiyama et al. |

FOREIGN PATENT DOCUMENTS

| JP | 58-35714 | 3/1983 | |
| JP | 2003-272103 A * | 9/2003 | ................ 360/59 |

* cited by examiner

*Primary Examiner*—Tan X Dinh
(74) *Attorney, Agent, or Firm*—Buchanan Ingersoll & Rooney PC

(57) ABSTRACT

A magnetic recording device is provided according to the present invention for magnetic recording on a recording medium. The magnetic recording device includes a planar waveguide having a propagation axis. The planar waveguide allows light received thereby to propagate along the propagation axis. The magnetic recording device further includes a magnetic pole having a yoke disposed adjacent the planar waveguide and a pole tip extending into the planar waveguide along the propagation axis. By extending the pole tip into, and incorporating it with, the planar waveguide, the light propagating through the planar waveguide and a magnetic flux flowing through the magnetic pole are co-locatable on a recording medium disposed adjacent the magnetic recording device.

19 Claims, 2 Drawing Sheets

US 7,440,384 B2

MAGNETIC RECORDING DEVICE FOR HEAT ASSISTED MAGNETIC RECORDING

CROSS-REFERENCE TO RELATED APPLICATIONS

This application is a continuation of co-pending patent application Ser. No. 10/374,451 entitled "Magnetic Recording Device for Heat Assisted Magnetic Recording", filed on Feb. 26, 2003, which application claims the benefit of Provisional Patent Application Ser. No. 60/390,172 entitled "Transparent Recording Pole for Heat Assisted Magnetic Recording", filed on Jun. 20, 2002, the entire disclosures of which are incorporated by reference herein.

FIELD OF THE INVENTION

The present invention is directed toward heat assisted magnetic recording in general and, more particularly, toward a recording pole including transparent and semi-transparent materials usable for heat assisted magnetic recording.

BACKGROUND OF THE INVENTION

The ability to increase the storage capacity in magnetic recording is an ongoing concern. As the amount of information to be stored continues to increase, demands for higher density recording also continue to increase. Heat assisted magnetic recording (HAMR) is one proposed technology for increasing the storage density of conventional magnetic recording devices. Heat assisted magnetic recording combines facets of both optical and magnetic recording in an effort to increase storage capacity.

Conventional hard disc drives rely on a magnetic field produced by a small recording pole formed on a recording head. The recording head and recording pole are on a slider that "flies" across the surface of the disc as the disc spins. The magnetic field from the small recording pole needs to be sufficient to overcome the coercivity of the magnetic recording medium in the disc in order to define the recorded bits along the recording track in the medium.

As the storage density of disc drives increases, the size of the recorded magnetic marks in the recording medium must correspondingly decrease. As used herein, a mark is simply a recorded feature and, depending on the encoding scheme, may be of varying lengths, e.g., 1, 2, 3, . . . bits. Additionally, the individual magnetic grains which make up a recorded mark must also decrease in size to maintain approximately the same number of grains per bit cell to assure a sufficient signal-to-noise ratio (SNR). However, as the volume of the magnetic grains decreases, the thermal stability of the grains will also decrease unless the coercivity of the recording medium is increased. The disc drive industry is rapidly approaching storage densities where the magnetic fields that can be generated by conventional recording poles will be insufficient to magnetically switch the magnetic grains in recording media with a coercivity large enough to ensure the thermal stability of recorded data for at least 10 years, which is an industry standard.

As previously noted, heat assisted magnetic recording is one proposed technique for circumventing this difficulty. Heat assisted magnetic recording reduces the coercivity of the magnetic grains only during recording by optically heating the spot to be recorded. Experiments with heat assisted magnetic recording have demonstrated that the optimum recording situation occurs when the optical spot is coincident with the magnetic recording field from the recording pole. Such coincidence of the optical spot and the magnetic field is possible when the substrate is transparent and the optical spot is approximately 1 micron by locating the optical head on the side of the recording medium opposite that of the magnetic recording head. However, for optical spots which are sub-wavelength, which are necessary for high storage densities, a near field light source must be used which requires the optical head to be located on the same side of the recording medium as the magnetic recording head. This raises another difficulty in that conventional magnetic recording poles are made up of materials having high permeabilities, such as FeCo alloys and the like, which are metallic and thus opaque to the light that is utilized to create the hot optical spot in the recording medium. Conventional recording poles thus do not permit co-location of the optical spot and the magnetic recording field on the recording medium.

One alternative which has been suggested is to generate the magnetic field by an electrical current rather than using a magnetic recording pole. For example, a copper coil may be lithographically deposited onto the bottom surface of a solid immersion lens or waveguide. The copper coil would not interfere with the light propagating through the center of the waveguide, and would still be capable of generating a magnetic field at the same location on the recording medium that the light from the waveguide is heating. Unfortunately, the magnetic fields that are reasonably generated by a coil are on the order of hundreds of Oersteds, which is approximately ten times smaller than the magnetic fields capable of being generating by placing a permeable material within the electrical coil. Such small magnetic fields may not be suitable for a HAMR storage device because they would require that the optical spot heat the recording medium to very close to its Curie point to substantially reduce the coercivity of the medium and allow the grains to be magnetically switched. Furthermore, the fields applied by the magnetic recording head need to be significantly larger than the fields produced by the previously written information on neighboring tracks to avoid an undesired modulation or transition shift in the written data pattern. The ferromagnetic nature of the recording media, the desire to maintain a strong read-back signal, and adequate thermal stability leads one to use recording media with a large remanent magnetization, which for high track density recording results in fields up to a few hundred Oe.

The present invention is directed toward overcoming one or more of the above-mentioned problems.

SUMMARY OF THE INVENTION

A magnetic recording device is provided according to the present invention for magnetic recording on a recording medium. The magnetic recording device includes a planar waveguide having a propagation axis. The planar waveguide allows light received thereby to propagate along the propagation axis. The magnetic recording device further includes a magnetic pole having a yoke disposed adjacent the planar waveguide and a pole tip extending into the planar waveguide along the propagation axis. By extending the pole tip into, and incorporating it with, the planar waveguide, the light propagating through the planar waveguide and a magnetic flux flowing through the magnetic pole are co-locatable on a recording medium disposed adjacent to the magnetic recording device.

In one form, the planar waveguide is a 2-dimensional waveguide and includes a layer of non-magnetic material having a first optical index of refraction surrounded by dielectric material having a second optical index of refraction less than the first optical index of refraction. The non-magnetic layer may include a parabolic tapering layer, tapering along the propagation axis to a first edge positionable adjacent the recording medium. In another form, the pole tip extends into the non-magnetic material layer and is coplanar with the non-magnetic material layer extending along the propagation axis to the first edge.

In a further form, the planar waveguide includes a transducer device disposed at the first edge for confining the light propagating through the planar waveguide. The transducer device may include a metal material deposited on an end of the pole tip at the first edge, with the metal material including an aperture formed therein.

To allow light to propagate therethrough, the pole tip includes an optical index of refraction that is index matched to the first optical index of refraction of the non-magnetic material layer.

In yet a further form, the planar waveguide and the magnetic pole are made of materials selected from the same material system. The material system from which the materials making up the planar waveguide and the magnetic pole are selected, may include garnets, ferrites, and other similar materials.

It is an aspect of the present invention to efficiently deliver light to the same spot as the recording magnetic field.

It is a further aspect of the present invention to deliver light to the same spot as the recording magnetic field while generating a recording field that is on the order of several thousand Oersteds.

It is still a further aspect of the present invention to combine a transparent waveguide with a partially transparent magnetic pole material to co-locate the optical and magnetic fields.

It is yet a further aspect of the present invention to co-locate optical and magnetic fields on a recording medium while minimizing the absorption and heating from the magnetic material.

Other aspects and advantages of the present invention can be obtained from a study of the specification, the drawings, and the appended claims.

DETAILED DESCRIPTION OF THE INVENTION

Figure 1:
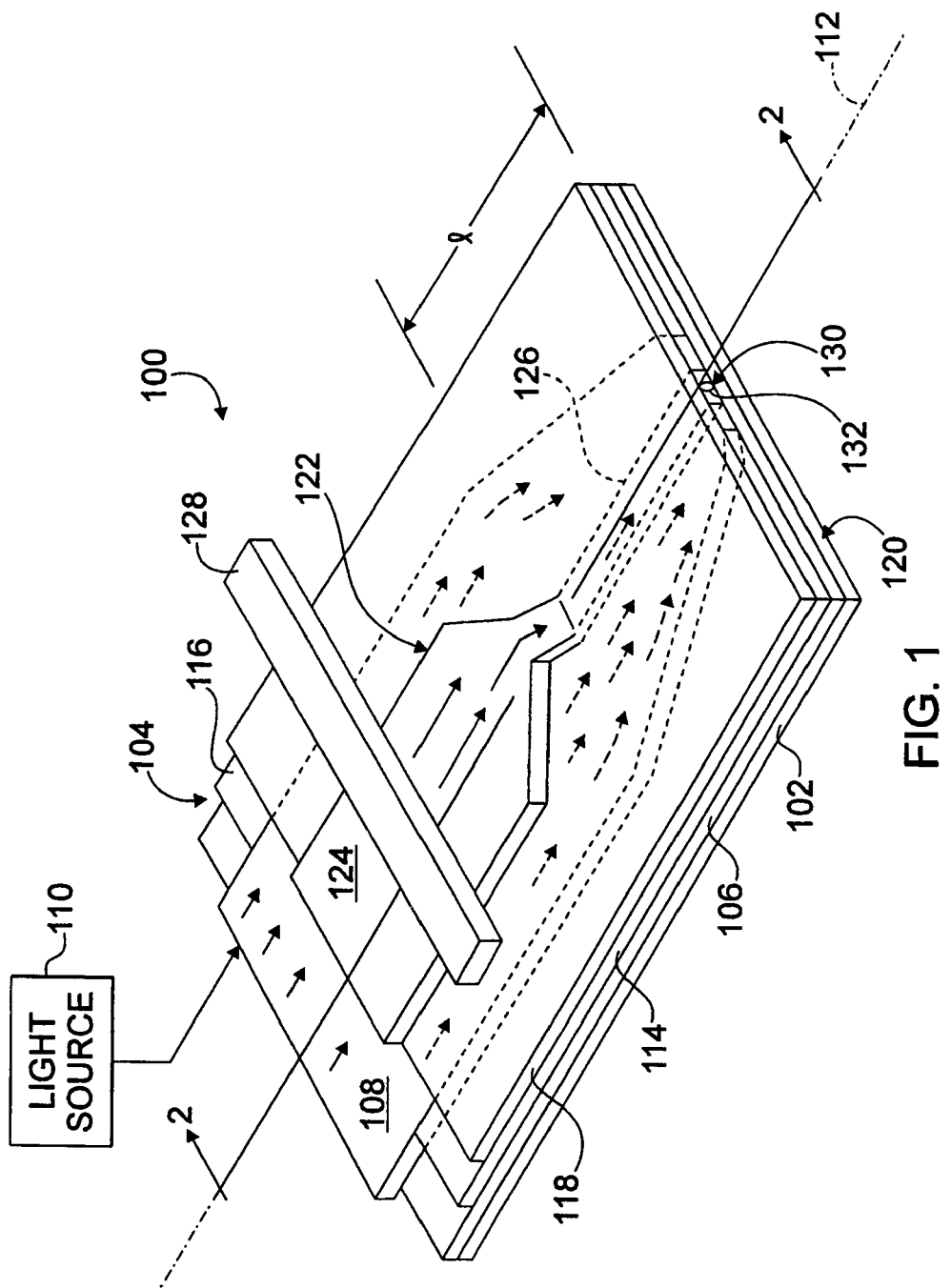
FIG. 1 is a perspective view of a magnetic recording head according to the present invention.
Figure 2:
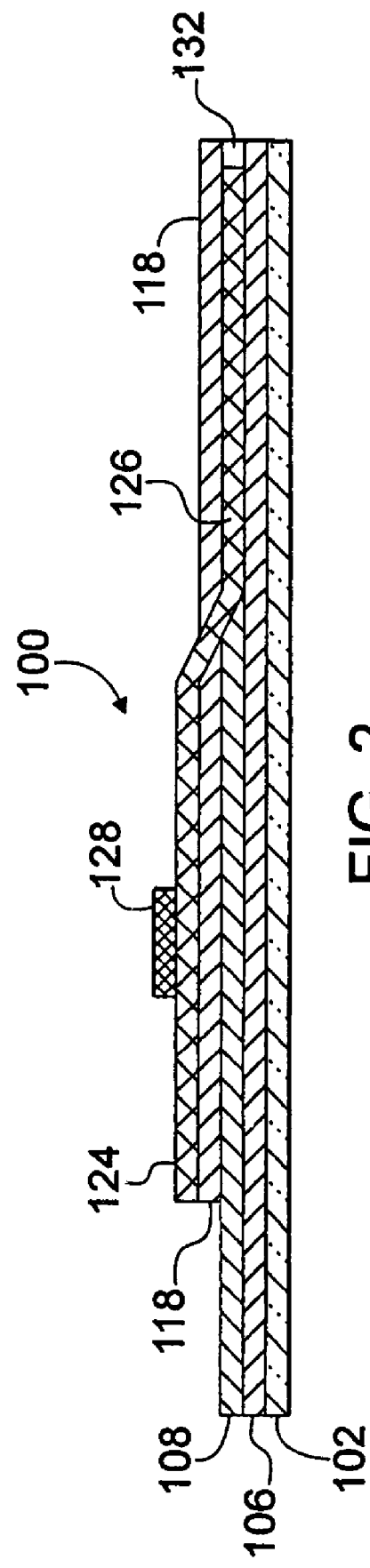
FIG. 2 is a cross-sectional view taken along line 2-2 in FIG. 1.

FIGS. 1-2 illustrate a magnetic recording head, shown generally at 100, according to the present invention. The magnetic recording head 100 shown in FIGS. 1-2 is a laminated structure formed by depositing various layers of materials on a conventional wafer typically utilized for the manufacture of magnetic reading and writing devices.

The magnetic recording head 100 includes a substrate 102 deposited on the wafer (not shown). A 2-dimensional, planar waveguide, shown generally at 104, is formed on top of the substrate 102. The planar waveguide 104 includes a layer of dielectric material 106 deposited on top of the substrate 102. The dielectric material layer 106 has a relatively low optical index of refraction. A layer of non-magnetic material 108 is deposited on top of the dielectric layer 106. The non-magnetic material layer 108 has a relatively high optical index of refraction, and allows light received from a light source 110 to propagate along its propagation axis 112. Dielectric material layers 114 and 116 having a relatively low optical index of refraction are deposited on top of the dielectric layer 106 on either side of the non-magnetic layer 108. A layer of dielectric material 118, also having a relatively low optical index of refraction, is deposited on top of the dielectric layers 114 and 116 and the non-magnetic layer 108.

By surrounding the non-magnetic layer 108, which has a high optical index of refraction, with dielectric layers 106, 114, 116 and 118, which have a low optical index of refraction, the planar waveguide 104 (including the dielectric layers 106, 114, 116 and 118 and the non-magnetic layer 108) will confine the light from the light source 110 to the non-magnetic layer 108 and allow it to propagate along the propagation axis 112 in a direction as shown by the arrows. As shown in FIG. 1, the non-magnetic material layer 108 includes a parabolic tapering layer, which tapers along the propagation axis 112 to an edge 120 of the magnetic recording head 100 as shown by the hidden lines. The waveguide 104 allows the light to flow along the propagation axis 112 and brings the light into focus near the edge 120.

In order for the waveguide 104 to sufficiently guide the light, the optical refractive index of the non-magnetic layer 108 must be greater than the optical refractive index of the dielectric layers 106, 114, 116 and 118. To avoid unnecessarily thick dielectric layers, the difference in the optical refractive indices should be as large as possible. By way of example, it is contemplated that the dielectric layers 106, 114, 116 and 118 have optical indices of refraction between 1.0-2.1, with the non-magnetic layer 108 having an optical index of refraction greater than 1.7.

The magnetic recording head 100 further includes a main magnetic pole, shown generally at 122. The main magnetic pole 122 includes a magnetic yoke 124 deposited on top of the dielectric layer 118 and adjacent the planar waveguide 104. If the material system has been chosen such that the structures of the dielectric layer 118 and the magnetic yoke 124 are compatible, no buffer layer is needed therebetween. The main magnetic pole 122 further includes a pole tip 126 which extends into the planar waveguide 104 also as shown by the hidden lines. The pole tip 126 extends through the dielectric layer 118 and into the non-magnetic layer 108, such that the pole tip 126 lies substantially coplanar with the non-magnetic material layer 108. The pole tip 126 extends along the propagation axis 112 to the first edge 120. The length "l" of the pole tip 126, i.e., the region which lies coplanar with the non-magnetic material 108, may be approximately 1-5 microns depending upon the absorption characteristics of the materials utilized.

A coil conductor 128 is deposited on top of the yoke 124 and is magnetically coupled thereto. The coil conductor 128 magnetizes the main pole 122 in a magnetization direction, as shown by the arrows. As should be apparent to one skilled in the art, since the pole tip 126 is integrated with the non-magnetic layer 108 of the waveguide 104, the pole tip 126 must be transparent enough to allow the propagation of light therethrough, but also exhibit useful magnetic properties to achieve a sufficient magnetic recording field to magnetically switch the grains in the recording medium. This can achieved by doping either the pole tip 126 or the non-magnetic material layer 108 of the waveguide 104 such that their optical refractive indices are matched.

The waveguide 104 further includes a transducer device 130 disposed at the first edge 120. The transducer device 130 confines and focuses the light propagating through the waveguide 104, and enables the optical spot and magnetic flux to be co-located on a recording medium (not shown) positionable adjacent the magnetic recording head 100. The transducer device 130 may include a metal material, such as aluminum and the like, deposited on an end of the pole tip 126 at the first edge 120, with an aperture 132 formed in the metal material.

Additionally, a solid immersion lens (SIL) device (not shown) could replace the transducer device 130 to properly focus the light propagating through the waveguide 104. The SIL device may be formed in the waveguide 104 by doping a portion of the non-magnetic material layer 108 near the first edge 120 to create a spherical region, or structure, i.e., a lens, in the non-magnetic material layer 108 to confine and focus the light to an optical spot. One skilled in the art will appreciate that other methods and/or structures of confining and focusing light propagating through an optical waveguide may be utilized without departing from the spirit and scope of the present invention.

The first edge 120 of the magnetic recording head 100 corresponds to the air bearing surface of the magnetic recording head 100, which will be positioned adjacent the recording medium (not shown). Typically, the air bearing surface 120 will be coated with a reflective material (not shown). By co-locating the optical spot with the magnetic flux on a magnetic recording medium, the light will reduce the coercivity of the recording medium only during recording, which in turn will help achieve higher storage densities on the recording medium.

In order to achieve a sufficient light source for heating the recording medium and a sufficient magnetic flux to magnetically switch the grains in the recording medium, the recording-head 100 makes use of the few materials which are transparent in the visible or infrared spectrum, and which are also magnetic. In general, very few magnetic materials are transparent enough to allow the propagation of light through the entirety of the necessary yoke structure. This is overcome in the present invention by guiding the light to the vicinity of the edge 120, or air bearing surface, through a truly transparent non-magnetic material layer 108 compatible with the magnetic material of the yoke 124, and combining the pole tip 126 with the optical waveguide 104 only over the last few microns (approximately 1-5 microns), a distance too great for conventional highly absorbing magnetic pole materials.

The magnetic recording head 100 of the present invention contemplates utilizing materials for respective layers that are selected from the same material system. As used herein, the term material system generally refers to a class of materials with the same crystal structure which can be doped to vary certain properties thereof. Such a material system may include garnets, ferrites, or other similar materials exhibiting useful magnetic and optical properties. However, it should be noted that different material systems may also be utilized for the respective layers without departing from the spirit and scope of the present invention. For example, two different material systems could be used for the dielectric layers 106, 114, 116 and 118 and the non-magnetic layer 108 as long as films of sufficient quality (low scattering) can be deposited upon one another.

In addition to iron garnets and ferrites which exhibit useful magnetic and optical properties sufficient for the yoke 124 and pole tip 126, other transparent magnetic materials of possible use include Ferric Borate ($FeBO_3$) or Orthoferrites. The garnets have a drop in absorption centered at a wavelength of approximately 800 nm, and also become transparent at wavelengths greater than 1000 nm. Truly transparent non-magnetic materials compatible with the iron garnets include, but are not limited to, yttrium aluminum garnet and gadolinium gallium garnet. Yttrium aluminum garnet is extremely transparent ($K<1e10^{-5}$) for wavelengths between 194 nm and 4.4 μm. Gadolinium gallium garnet is quite transparent throughout the visible spectrum.

For example, assuming that iron garnets were chosen as the material system for the yoke 124 and pole tip 126, the various layers of the magnetic recording head 100 could be made of the following materials. The substrate 102 could be made of aluminum-titanium-carbide, or other conventional slider substrate materials. The dielectric layers 114, 116 and 118 could be made of $SiO_2$, $MgF_2$, $Al_2O_3$, etc., having a low optical index of refraction ($SiO_2 \approx 1.46$; $MgF_2 \approx 1.38$; $Al_2O_3 \approx 1.6$). The indices of refraction of the dielectric layers 114, 116 and 118 may or may not be the same. The dielectric layer 106 should be a dielectric material that is compatible with the garnet crystal structure of the non-magnetic layer 108 of the planar waveguide 104. The dielectric layer 106 and/or the non-magnetic layer 108 may be a gallium garnet having the formula $R_{3-x}M_xGa_{5-y}N_yO_{12}$ and/or an aluminum garnet having the formula $R_{3-x}M_xAl_{5-y}N_yO_{12}$, sufficiently doped such that they are compatible with each other, with the dielectric layer 106 having a low optical index of refraction and the non-magnetic layer 108 having a high optical index of refraction. In the chemical formulas provided herein for the iron garnet material system, "R" may be any rare earth element, "M" may be any large trivalent (3+) ion or any valence state when compensated by an appropriate change in the valence state of N, and "N" may be any small trivalent (3+) ion or any valence state when compensated by an appropriate change in the valence state of M. Additionally, and for exemplary purposes only, depending upon the material used for the dielectric layer 106, the non-magnetic layer 108 may also be made of SiN, $Ta_2O_5$, $TiO_2$, ZnSe, etc., having a high optical index of refraction ($1.9 \leq SiN \leq 2.0$; $2.0 \leq Ta_2O_5 \leq 2.2$; $2.2 \leq TiO_2 \leq 2.7$; $2.4 \leq ZnSe \leq 2.6$). The yoke 124 and pole tip 126 may be made of the iron garnet magnetic pole material $R_{3-x}M_xFe_{5-y}N_yO_{12}$, with the pole tip 126 sufficiently doped such that it includes an optical refractive index that is index matched to the optical refractive index of the non-magnetic material layer 108.

Similarly, assuming that ferrites were chosen as the material system for the yoke 124 and pole tip 126, the various layers of the magnetic recording head 100 could be made of the following materials. The substrate 102 and the dielectric layers 114, 116 and 118 could be made of the same materials as previously identified for the iron garnet material system. The dielectric layer 106 should be a dielectric material that is compatible with the ferrite crystal structure of the non-magnetic layer 108 of the planar waveguide 104. The dielectric layer 106 and/or the non-magnetic layer 108 may be substituted aluminum spinels, such as $Zn_{1-x}M_xAl_{2-y}N_yO_4$, sufficiently doped such that they are compatible with each other, with the dielectric layer 106 having a low optical index of refraction and the non-magnetic layer 108 having a high optical index of refraction. In the chemical formulas provided herein for the ferrite material system, "M" may be any divalent ion and "N" may be any trivalent ion which can be substituted in the spinel crystal structure. Additionally, and for exemplary purposes only, depending upon the material used for the dielectric layer 106, the non-magnetic layer 108 may also be made of SiN, $Ta_2O_5$, $TiO_2$, ZnSe, etc., having a high optical index of refraction as previously noted. The yoke 124 and pole tip 126 may be made of the appropriately doped magnetic pole materials, $Mn_{1-x}M_xFe_{2-y}N_yO_4$, $Ni_{1-x}M_xFe_{2-y}N_yO_4$, or $Li_{1-x}M_xFe_{2-y}N_yO_4$, with the pole tip 126 sufficiently doped such that it includes an optical refractive index that is index matched to the optical refractive index of the non-magnetic material layer 108.

One skilled in the art will readily understand that by careful design of the magnetic recording head 100 structure using compatible laminated structures of a transparent waveguide with a partially transparent pole material, the designer will be able to co-locate the optical and magnetic fields while minimizing the absorption and heating from the magnetic material. Thus, the magnetic recording head 100 of the present invention, when used with heat assisted magnetic recording, will be able to achieve higher recording densities than are currently achievable utilizing conventional magnetic recording heads.

While the present invention has been described with particular reference to the drawings, it should be understood that various modifications could be made without departing from the spirit and scope of the present invention.

I claim:

1. A magnetic recording device comprising:
    a planar waveguide having a propagation axis; and
    a magnetic pole having a yoke disposed adjacent the planar waveguide and a pole tip, at least part of the pole tip extending into the planar waveguide along the propagation axis, wherein said at least part of the pole tip is made of a transparent material, wherein the planar waveguide comprises:
        a layer of non-magnetic material having a first index of refraction; and
        first and second layers of dielectric material having a second index of refraction disposed on each side of the non-magnetic material layer and coplanar with the non-magnetic material layer, wherein the first index of refraction is greater than the second index of refraction.

2. The magnetic recording device of claim 1, wherein said at least part of the pole tip is coplanar with the planar waveguide and extends along the propagation axis to a first edge positionable adjacent a recording medium.

3. The magnetic recording device of claim 1, wherein the non-magnetic material layer includes a parabolic tapering layer tapering along the propagation axis toward an air bearing surface of the magnetic recording device.

4. The magnetic recording device of claim 1, wherein said at least part of the pole tip includes an index of refraction that is index matched to the first index of refraction of the non-magnetic material layer.

5. The magnetic recording device of claim 1, wherein the planar waveguide further comprises third and fourth layers of dielectric material having the second index of refraction disposed above and below the non-magnetic material layer.

6. The magnetic recording device of claim 1, wherein the planar waveguide includes a transducer device disposed at an air bearing surface of the magnetic recording device, the transducer device confining the light propagating through the planar wave guide.

7. The magnetic recording device of claim 6, wherein the transducer device comprises a metal material deposited on an end of said at least part of the pole tip at the air bearing surface, the metal material including an aperture formed therein.

8. The magnetic recording device of claim 1, wherein the planar waveguide and the magnetic pole are made of materials selected from the same material system.

9. The magnetic recording device of claim 8, wherein the same material system includes garnets or ferrites.

10. A magnetic recording device comprising:
    a planar waveguide having a propagation axis; and
    a magnetic pole having a yoke disposed adjacent the planar waveguide and a pole tip, at least part of the pole tip extending into the planar waveguide along the propagation axis, wherein said at least part of the pole tip is made of a transparent material, wherein the planar waveguide comprises a layer of non-magnetic material having a first index of refraction surrounded by dielectric material having a second index of refraction less than the first index of refraction.

11. The magnetic recording device of claim 10, wherein the non-magnetic material layer includes a parabolic tapering layer tapering along the propagation axis to a first edge positionable adjacent a recording medium.

12. The magnetic recording device of claim 11, wherein said at least part of the pole tip is coplanar with the non-magnetic material layer and extends along the propagation axis to the first edge.

13. The magnetic recording device of claim 12, wherein said at least part of the pole tip includes an index of refraction that is index matched to the first index of refraction of the non-magnetic material layer.

14. The magnetic recording device of claim 12, wherein the planar waveguides includes a transducer device disposed at the first edge, the transducer device confining the light propagating through the planar waveguide.

15. The magnetic recording device of claim 14, wherein the transducer device comprises a metal material deposited on an end of said at least part of the pole tip at the first edge, the metal material including an aperture formed therein.

16. The magnetic recording device of claim 10, wherein the planar waveguide includes a transducer device disposed at an air bearing surface of the magnetic recording device, the transducer device confining the light propagating through the planar waveguide.

17. The magnetic recording device of claim 16, wherein the transducer device comprises a metal material deposited on an end of said at least part of the pole tip at the air bearing surface, the metal material including an aperture formed therein.

18. The magnetic recording device of claim 10, wherein the planar waveguide and the magnetic pole are made of materials selected from the same material system.

19. The magnetic recording device of claim 18, wherein the same material system includes garnets or ferrites.

* * * * *

UNITED STATES PATENT AND TRADEMARK OFFICE
CERTIFICATE OF CORRECTION

| | | |
|---|---|---|
| PATENT NO. | : 7,440,384 B2 | Page 1 of 1 |
| APPLICATION NO. | : 11/709065 | |
| DATED | : October 21, 2008 | |
| INVENTOR(S) | : Walter Richard Eppler | |

It is certified that error appears in the above-identified patent and that said Letters Patent is hereby corrected as shown below:

Col. 1, Line 5-7 please insert the following heading and paragraph immediately preceding the heading "FIELD OF THE INVENTION" in the specification:

-- STATEMENT REGARDING FEDERALLY SPONSORED RESEARCH

This invention was made with United States Government support under Agreement No. 70NANB1H3056 awarded by the National Institute of Standards and Technology (NIST).

The United States Government has certain rights in the invention. --

Signed and Sealed this

Seventeenth Day of February, 2009

JOHN DOLL
*Acting Director of the United States Patent and Trademark Office*